US010587734B2

(12) United States Patent
Merkel et al.

(10) Patent No.: US 10,587,734 B2
(45) Date of Patent: *Mar. 10, 2020

(54) METHOD FOR OPERATING A SOFTWARE DEFINED NETWORK AND A SOFTWARE DEFINED NETWORK

(71) Applicant: NEC CORPORATION, Tokyo (JP)

(72) Inventors: Martin Merkel, Sandhausen (DE); Fabian Schneider, Heidelberg-Bahnstadt (DE)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/218,521

(22) Filed: Dec. 13, 2018

(65) Prior Publication Data

US 2019/0124185 A1    Apr. 25, 2019

Related U.S. Application Data

(63) Continuation of application No. 14/893,530, filed as application No. PCT/EP2013/064071 on Jul. 3, 2013, now Pat. No. 10,187,499.

(51) Int. Cl.
*H04L 29/08* (2006.01)
*G06F 13/38* (2006.01)
*H04L 29/06* (2006.01)

(52) U.S. Cl.
CPC .......... *H04L 69/324* (2013.01); *G06F 13/385* (2013.01); *H04L 69/22* (2013.01); *G06F 2213/3808* (2013.01)

(58) Field of Classification Search
CPC ..... H04L 69/324; H04L 69/22; G06F 13/385; G06F 2213/3808
See application file for complete search history.

(56) References Cited

U.S. PATENT DOCUMENTS 9,736,036 B2    8/2017  Szyszko et al.
10,050,854 B1 *  8/2018  Licking ................... H04L 43/08
(Continued)

FOREIGN PATENT DOCUMENTS

EP          1014651 A2    6/2000

OTHER PUBLICATIONS

Andrew R Curtis et al: "DevoFlow", SIGCOMM, ACM, 2 Penn Plaza, Suite 701 New York NY 10121-0701 USA, Aug. 15, 2011 (Aug. 15, 2011), pp. 254-265, XP058006656.

*Primary Examiner* — Min Jung
(74) *Attorney, Agent, or Firm* — Leydig, Voit & Mayer, Ltd.

(57) ABSTRACT

A method for operating a software defined network (SDN) includes creating, by a software defined network controller, packet template information including a packet template and fill-in instructions, wherein the packet template defines a fill-in-the-blank packet. The method also includes sending, from the software defined network controller to a switch via a control channel, the packet template information and receiving, by the switch from a requestor, an incoming packet. The method further includes triggering, by determining that the incoming packet matches the packet template, the switch to generate an output packet, wherein the output packet is generated by using the fill-in instructions to fill in the fill-in-the-blank packet defined by the packet template. In addition, the method includes sending, by the switch to the requestor, the output packet.

18 Claims, 2 Drawing Sheets

(56) References Cited

U.S. PATENT DOCUMENTS

| | | |
|---|---|---|
| 2003/0185210 A1 | 10/2003 | McCormack |
| 2006/0239196 A1 | 10/2006 | Khanna et al. |
| 2008/0256506 A1 | 10/2008 | Chaar et al. |
| 2011/0007754 A1 | 1/2011 | Pepper et al. |
| 2013/0194949 A1* | 8/2013 | Ruddick ............... H04L 43/028 370/252 |
| 2013/0254634 A1 | 9/2013 | Luby et al. |
| 2014/0169179 A1* | 6/2014 | Ding ................... H04L 43/0811 370/241.1 |
| 2015/0023210 A1* | 1/2015 | Kis ..................... H04L 41/0806 370/254 |
| 2015/0163330 A1 | 6/2015 | Ni et al. |
| 2017/0237614 A1* | 8/2017 | John ................... H04L 41/042 370/236.2 |

\* cited by examiner

METHOD FOR OPERATING A SOFTWARE DEFINED NETWORK AND A SOFTWARE DEFINED NETWORK

CROSS REFERENCE TO RELATED APPLICATIONS

This application is a continuation of U.S. patent application Ser. No. 14/893,530, filed Nov. 24, 2015, which is a U.S. National Stage Application under 35 U.S.C. § 371 of International Application No. PCT/EP2013/064071 filed on Jul. 3, 2013, both of which applications are hereby incorporated by reference herein. The International Application was published in English on Jan. 8, 2015 as WO 2015/000517 A1 under PCT Article 21(2).

FIELD

The present invention relates to a method for operating a software defined network comprising forwarding elements and a software defined network controller for controlling the forwarding elements. The invention further relates to a software defined network including forwarding elements and a software defined network controller for controlling the forwarding elements.

BACKGROUND

Conventional software defined networks typically transport instructions on how to forward traffic via a control channel, for example between software defined network switches and a software defined controller. The control channel may also be configured in such a way that it can be used to transport whole packets from the software defined network switch to the controller as well as possible reaction packets back to the software defined network switch. This is for example used in conventional software defined networks when dealing with network control traffic at the controller such as ICNP or ARP. A request packet of a certain type is received by the switch, forwarded to the controller and the controller in turn generates an appropriate response packet, transmits it back to the switch which sends it out as response to the requestor.

However, conventional software defined networks have the problem, that communication between the software defined network switches and the software defined network controller causes overhead in terms of delay and control channel bandwidth. Moreover the corresponding software defined network agent in the software defined network switch is a bottleneck, because the agent runs typically in the GPU of the switch and has to en/-decrypt the communication over the control channel to ensure security between the controller and the switch.

In the non patent literature of Andrew A. Curtis, Jeffrey C. Mogul, Jean Tourrilhes, Praveen Yalagandula, Puneet Sharma, and Sujata Banerjee. 2011, DevoFlow: scaling flow management for high-performance networks. In Proceedings of the ACM SIGCOMM 2011 conference (SIGCOMM '11). ACM, New York, N.Y., USA, 254-265. DOI=10.1145/2018436.2018466 http://www.cmlab.csie.ntu.edu.tw/~kenneth/quing2011/paper6.pdf a method is described which hands back some functionality, for example forwarding or routing to the software defined network switch and only statistics about the status of the (physical network) are reported to the controller. The controller may then pick which flows to control.

In the non patent literature of J. M. Smith and S. M. Nettles. 2004, Active networking: one view of the past, present, and future, Trans. Sys. Man Cyber Part C 34, 1 (February 2004), 4-18, DOI=10.1109/TSMCC.2003.818493, http://repository.upenn.edu/cispapers/46/, Active Networking is described which makes network elements into code interpreters. Transmitted data packets carry a piece of code determining how the packet is handled by the network elements.

Further in EP 1 014 651 A2 a programmable network element is described enabling to specify code to be executed on packets locally on the switches command line interface or a "remote program injector". However, one of the drawbacks is, that arbitrary code has to be performed or executed on the switch resulting in a high load on the GPU of the switch.

SUMMARY

According to an embodiment, a method is provided for operating a software defined network (SDN). The SDN includes forwarding elements and a software defined network controller, the software defined network controller configured to control the forwarding elements, the forwarding elements including a switch. The method includes creating, by the software defined network controller, packet template information, wherein the packet template information includes a packet template and fill-in instructions, wherein the packet template defines a fill-in-the-blank packet. The method also includes sending, from the software defined network controller to the switch via a control channel, the packet template information and receiving, by the switch from a requestor, an incoming packet. The method further includes triggering, by determining that the incoming packet matches the packet template, the switch to generate an output packet, wherein the output packet is generated by using the fill-in instructions to fill in the fill-in-the-blank packet defined by the packet template. In addition, the method includes sending, by the switch to the requestor, the output packet.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
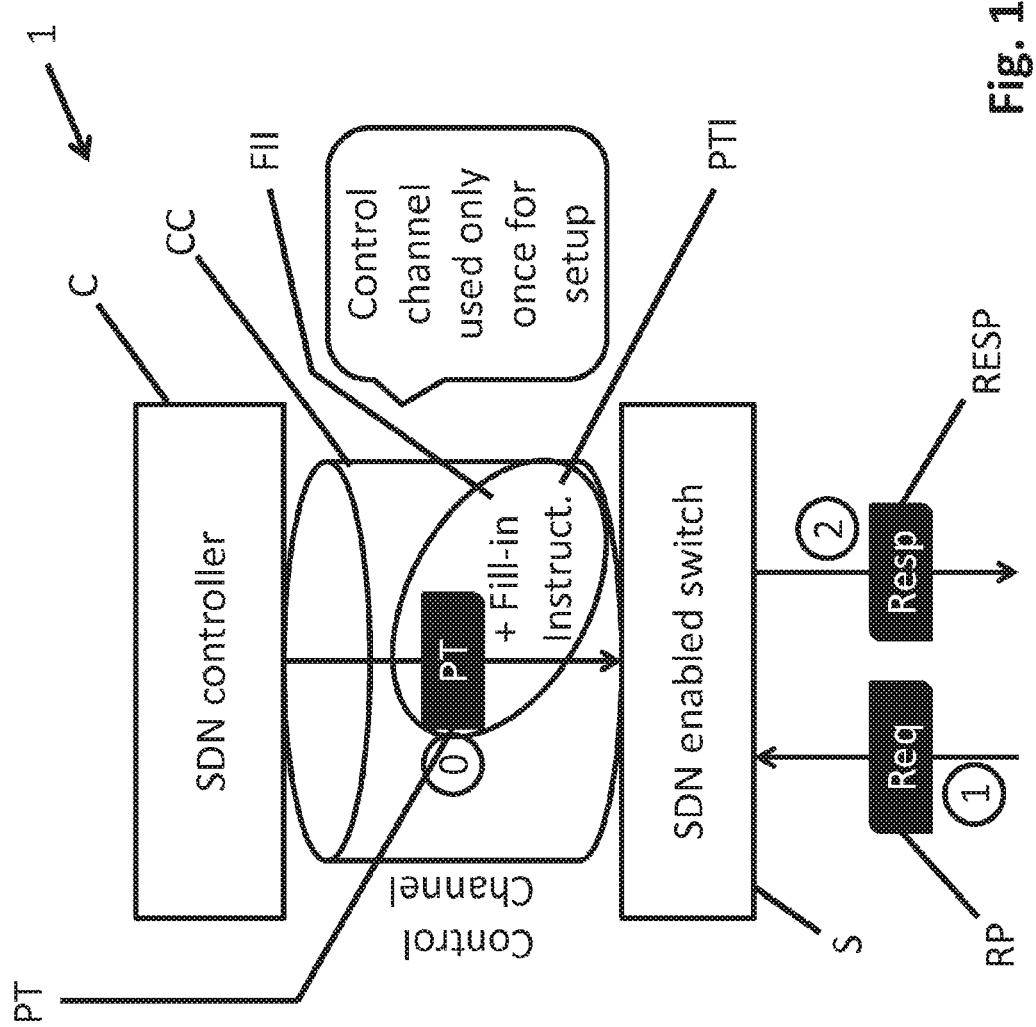
FIG. 1 shows steps of a method for operating a software defined network according to an embodiment of the present invention.

In an embodiment, the present invention provides a method for operating a software defined network and a software defined network with reduced load on the control channel of the software defined network.

In an embodiment, the present invention provides a method for operating a software defined network and a software defined network enabling reduced load on the entities of the software defined network in particular reduced CPU resources needed on the controller and on the forwarding elements.

In an embodiment, the present invention provides a method for operating a software defined network and a software defined network with reduced packet-in processing load on the software defined network controller.

In an embodiment, the present invention provides a method for operating a software defined network and a software defined network with reduced delay for responses generated on incoming requests.

In an embodiment, the present invention provides a method for operating a software defined network and software defined network which are easy to implement and cost-effective.

In an embodiment, a method for operating a software defined network, comprising forwarding elements and a software defined network controller for controlling the forwarding elements, is defined. The method is characterized in that:
a) packet template information including one or more packet templates and/or packet template handling instructions is created and provided to one or more forwarding elements,
b) the one or more forwarding elements are triggered to generate an output packet based on the provided packet template information, and
c) the forwarding element sends out the generated output packet.

In an embodiment, a software defined network, comprising forwarding elements and a software defined network controller for controlling the forwarding elements, is defined. The software defined network is characterized in that:
the software defined controller is operable to create packet template information including one or more packet templates and/or packet template handling instructions and to provide them to one or more forwarding elements, and
the one or more forwarding elements are operable to be triggered to generate an output packet based on the provided packet template information and to send out the generated output packet.

In an embodiment, a method is used for providing a firewall on a forwarding element.

According to the invention, it has been recognized that, by using one or more packet templates, the load on the control channel between the forwarding elements and the software defined network controller is significantly reduced.

According to the invention it has been further recognized that also CPU resources needed for en/-decryption on the controller as well as on the forwarding element are reduced.

According to the invention it has been further recognized that packet-in processing load on the software defined network controller is reduced.

According to the invention has been further recognized that responses on incoming requests are provided faster.

According to the invention it has been even further recognized that the software defined network concept of programming a network is preserved and therefore an easy implementation is enabled in existing software defined networks.

In an embodiment, the present invention describes a mechanism to generate packets directly on the forwarding elements of the software defined network without sacrificing the flexibility of software defined networks while allowing low response-times and reducing the load on the software defined network control channel and the software defined network controller itself. The term "Packet template" refers to fill-in-the-blank packets which are sent from the controller to the forwarding element together with one or more packet template filling instructions how to fill the blanks with information based on certain received packets respectively request packets. This packets template together with its fill-in instructions, i.e. packet template information, creates a new target for example software defined network rules executable if an input packet matches certain criteria. Packet template filling instructions may for example include one or more matching rules on how to match a packet with the packet template and further may include one or more action rules specifying what to do or how to generate a packet to be send out by a forwarding element.

According to a preferred embodiment, triggering instructions are provided to a forwarding element by including them into the packet template information. This enables in an easy way to provide triggering instructions for the generation of output packets by the controller.

According to a further preferred embodiment, the one or more forwarding elements are triggered by an incoming packet, preferably a request packet, on the one or more forwarding elements. This enables to process incoming request packets directly on the forwarding element without the need to exchange information and/or the received packet with the controller.

According to a further preferred embodiment, an incoming packet is checked whether it matches with the installed packet template information on a forwarding element. This ensures correct handling of incoming packets on forwarding elements according to the installed packet template information.

According to a further preferred embodiment, the forwarding element is continuously, preferably periodically, triggered to send out packets according to packet template information, preferably in form of LLDP-messages. This enables for example increasing sequence numbers ensuring compatibility with certain network control protocols According to a further preferred embodiment, triggering is performed upon reception of a packet matching a predefined parameter, preferably a set of header fields. This enables in an easy way a triggering of a generation of packets based on packet templates when a predefined parameter is matched. For example when a packet is received and matches certain header fields according to the packet template instructions then a generation of one of more response packets based on the packet template is performed.

According to a further preferred embodiment, packet template handling instructions specify from where in the request packet the corresponding gaps in a blank packet dedicated as response packet are filled. This enables in a very easy way to make use of packet template information respectively packet templates. For example the packet template handling instructions may specify in terms of bit position and the bit lengths, header field or the like in the request packet the gaps in the packet template to be filled. A further example would be to copy a source MAC/IP address from the request packet to the packet template thus enabling a sending of a preprogrammed reply back to the requestor with a response packet.

According to a further preferred embodiment, a computing, preferably arithmetic and/or logic operations from the content of the request packet is performed and a result is used for filling the gaps in a blank packet dedicated as response packet. This enables a more complex handling of the generation of response packets based on the content of request packets. For example a description language may be defined for these computations and the language enables defining possibilities for filling in the gaps in the response packet based on computation from the content of the request package. In particular certain arithmetic and/or bit-shifting operations, such as decrement by X, for example for TTL modifications or the like may be provided. Another option is to restrict computation operations to those that are already supported by the corresponding forwarding element.

According to a further preferred embodiment, a state of the forwarding element is accessed and used for filling the gaps in a blank packet dedicated as response packet. One of the advantages is, that instead of filling the gaps in the packet template with the information from a previous packet respectively from a request packet the information can originate from the state already existing in the forwarding element, for example forwarding table entries or the like.

According to a further preferred embodiment, a state of the forwarding element is accessed, a computing, preferably arithmetic and/or logic operations, on the state information is performed and used for filling the gaps in a blank packet dedicated as response packet. This allows for example to store a counter for handling out IP ranges via DHCP.

According to a further preferred embodiment, packet template handling instructions include copying for range of bytes to a packet template, filling the random numbers, copy bytes and/or math performing, change of counters in a state of a forwarding element and/or store, read and/or modify information in a memory of the forwarding element. This enables providing of a set of instruction primitives used to fill the blanks in the blank packet: For example copying bytes and perform math enables perform an increment, decrement, add, subtract, multiply, divide, modulo operation and/or bit-wise arithmetic's, etc. Of course only one of the instructions mentioned above can be used as well as a combination of the instructions mentioned above.

According to a further preferred embodiment, the software defined network controller installs specific states on the forwarding element usable for filling the gaps in the blank packet dedicated as response packet. This extends the flexibility of the method enabling the controller to install for example specific forwarding tables on the forwarding element(s) which can then be used when a filling the gaps of packet templates.

In FIG. 1 it is illustrated that, when using packet templates, no requests are sent over the control channel and the response is sent only once in a form of a packet template PT and/or the fill-in instructions FII.

In a preliminary step denoted with reference sign 0, the software defined network controller C sends one or more packet templates PT with corresponding fill-in instructions FII as packet template information PTI via a control channel CC to the software defined network enabled switch S. This control channel CC may only be used once for set up of packet templates PT and/or fill-in instructions of the software defined network enabled switch S. It is further possible that the controller C updates, removes or alters installed packet template information on software defined network switches. On incoming 1 of a request packet RP of a requestor on the software defined network enabled switch S the software defined network enabled switch S checks whether the incoming request packet RP matches with the packet template information PTI, including the packet template PT. If yes, then the software defined network enabled switch S uses the corresponding fill-in instructions FII of the packet template information PTI to fill a blank packet according to the packet template with information corresponding to the fill-in-instructions FII. After that, the software defined network enabled switch S responds 2 with a response packet RESP back to the requestor.

For example a method according to the present invention can be used for providing a response generation for the so-called neighbor discovery protocol for the IPv6 protocol. When for example the software defined network controlled switch S is connected to a non-software defined network control led IPv6 network, then according to RFC 4861 the immediate response is mandated to both router and neighbor solicitation messages. If the software defined network switch S acts as an IPv6 router then the software defined network switch S needs to respond to such solicitation messages with router and neighbor advertisement messages. The generation of those packet templates is provided into which only the source IP address of the requestor needs to be copied.

Another example is that when copying the requestor's source address into the response packet it can also be used for the generation of DHCP offer and DHCP acknowledgement messages.

Another example of a method according to the present invention may be ICMP messages in software defined networks. When for example a software defined network would like to control when and how in software defined networks ICMP messages are generated, then the software defined network controller configures the corresponding behavior on the switches with the ability to update this configuration once in a while. By using packet templates the generation of ICMP messages, for example Echo replies, Destination unreachable messages, TTL expired messages, etc. and transmitting them through the control channel, can be shifted from the software defined network controller C to the software defined network enabled switch S ensuring a correct response behavior. This enables for example to build a complete packet filter and firewall with a software defined network enabled switch S which is especially beneficial when dealing with attacks such as port scans when many ICMP messages with almost similar content would be sent back to the attacher respectively scanner.

As further example of a method according to the present invention in software defined networks it is no longer required to broadcast an ARP request through the complete broadcast domain until it reaches the requested host. The software defined network controller C may learn and track the IP<->MAC-address mappings and respond to ARP requests himself. The packet template information is then used to program the ARP replies directly via the software defined network enabled switches S.

Further a method according to the present invention may be used for a software defined network based configuration of CBPDU processing in Spanning Tree Protocols: When for example the software defined network switch S resides on an edge to a legacy network, which is not under control of the software defined network and the legacy network uses a Spanning Tree Protocol like STP, RSTP, MSTP or the like, then if the software defined network switch S participates in the Spanning Tree Protocol, the software defined network switch S needs to process Configuration BPDU messages CBPDU. The root Spanning Tree Protocol bridge sends a CBPDU message to the software defined network switch S which in turn emits CBPDU messages on its designated ports. With the packet templates information such CBPDU messages are generated on the software defined network enabled switch S based on the received CBPDU messages from the root bridge. For example packet templates may be used for CBPDU processing by:

i) Copying the "Root Identifier" and the "Flags" from an ingress CBPDU message (assuming the Flags do not indicate a Topology change in which case the CBPDU should be),
ii) calculating the "Message Age" based on the ingress CBPDU information and
iii) having the other CBPDU fields (most in particular "Bridge Identifier" and "Port Identifier") defined by the packet template information PTI.

Further examples for embodiments of the present invention include:
When there is a need to generically respond to request packets originating from non-software defined network/legacy network control protocols the present invention may be used when the software defined network controlled forwarding element is an edge between the software defined network controlled domain and the legacy network. Even further the packet templates together with the packet template information are especially useful when in particular fairly low layer control protocols are in operation that operate in a "request to one/many—respond to requestor" fashion like responding to frequent DNS requests.
Even further the present invention may be used to implement path monitoring mechanisms, for example RTT measurements in the software defined network.

Figure 2:
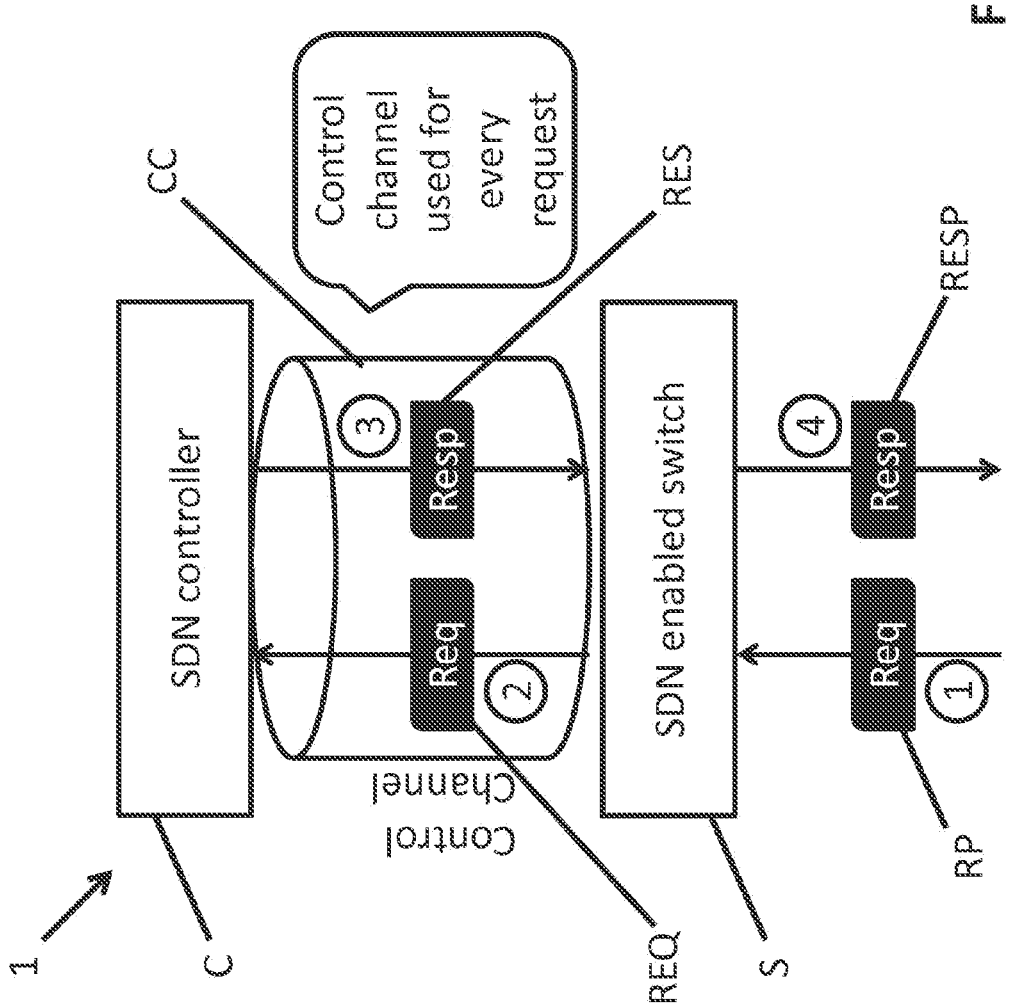
FIG. 2 shows a conventional method for operating a software defined network.

In FIG. 2 a conventional method for operating and a software defined network is shown.

On incoming 1 of a request packet RP of a requestor on a software defined network enabled switch S, the software defined network enabled switch S sends 2 a corresponding request REQ via the control channel CC to the software defined network controller C. The software defined network controller C processes the request from the software defined network enabled switch S and sends 3 a corresponding response RES via the control channel CC back to the software defined network enabled switch S. The software defined network enabled switch S then sends 4 a corresponding response packet RESP back to the requestor.

An embodiment of the present invention inter alia extends the concept of controlling the software defined network by including packet generation on a software defined network forwarding element e. g. a. switch and in particular this can be used in combination with the possibility to periodically generate such response packets. The embodiment of the present invention further enables extending the software defined network controlled forwarding element switch state to include controller defined tables that are not used in the forwarding process. Such tables may be used to lookup information for filling the gaps of the packet templates.

The present invention may be particularly useful when only slightly different respond packets need to be send out at a high rate in response to incoming request packets. Further the present invention may be particularly useful for switches respectively forwarding elements on network borders between legacy/non-software defined network networks and software defined networks.

One advantage of the present invention is that load on a software defined network control channel can be reduced. This refers in particular to CPU resources for en- and/or decryption on the controller as well as on the software defined network forwarding element and to bandwidth requirements between the software defined network controller and a corresponding forwarding element, for example the software defined network enabled switch. One of the further advantages is that packet-in processing load on a software defined network controller can be reduced. Even further delay for responses to be generated is reduced by using packet templates information and the software defined network concept of programming the network may be preserved.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for operating a software defined network, comprising forwarding elements and a software defined network controller, the software defined network controller configured to control the forwarding elements, the forwarding elements including a switch, the method comprising:
creating, by the software defined network controller, packet template information, wherein the packet template information includes a packet template and fill-in instructions, wherein the packet template defines a fill-in-the-blank packet;
sending, from the software defined network controller to the switch via a control channel, the packet template information;
receiving, by the switch from a requestor, an incoming packet;
triggering, by determining that the incoming packet matches the packet template, the switch to generate an output packet, wherein the output packet is generated by using the fill-in instructions to fill in the fill-in-the-blank packet defined by the packet template; and
sending, by the switch to the requestor, the output packet, wherein the switch is an edge between the software defined network and a legacy network.

2. The method according to claim 1, wherein the requestor is a component of the legacy network.

3. The method according to claim 2, wherein the legacy network uses a spanning tree protocol.

4. The method according to claim 3, wherein the spanning tree protocol is spanning tree protocol (STP), rapid spanning tree protocol (RSTP), or multiple spanning tree protocol (MSTP).

5. The method according to claim 3, wherein the incoming packet received from the requestor is a configuration bridge protocol data unit (CBPDU) and wherein the output packet is a CBPDU message.

6. The method according to claim 5, wherein the fill-in-the-blank instructions include instructions to calculate a message age based on the incoming packet.

7. The method according to claim 5, wherein the fill-in-the-blank instructions include instructions to copy a root identifier and flags from the incoming packet.

8. The method according to claim 1, wherein the incoming packet is a domain name system (DNS) request.

9. The method according to claim 8, wherein the packet template is a template for a response to a DNS request.

10. The method according to claim 1, wherein the switch is connected to a non-software defined network control led IPv6 network.

11. The method according to claim 10, wherein the switch is configured to act as an IPv6 router.

12. The method according to claim 11, wherein the incoming packet from the requestor is a router or neighbor solicitation message, and wherein the switch is configured to respond to router and neighbor solicitation messages with router and neighbor advertisement messages.

13. The method according to claim 12, wherein the packet template is a template for the router and neighbor advertisement messages and wherein the output packet is generated by copying a source address of the requestor into the fill-in-the-blank packet defined by the packet template.

14. The method according to claim 1, wherein the packet template information specifies replies to address resolution protocol (ARP) requests.

15. A software defined network, comprising:
forwarding elements including a switch; and
a software defined network controller configured to control the forwarding elements, the software defined network controller being configured to:
   create packet template information, wherein the packet template information includes a packet template and fill-in instructions, wherein the packet template defines a fill-in-the-blank packet, and
   send, to the switch via a control channel, the packet template information;
wherein the switch is configured to:
   receive, from a requestor, an incoming packet;
   generate, in response to determining that the incoming packet matches the packet template, an output packet, wherein the output packet is generated by using the fill-in instructions to fill in the fill-in-the-blank packet defined by the packet template; and
   send, to the requestor, the output packet,
wherein the switch is an edge between the software defined network and a legacy network.

16. The software defined network according to claim 15, wherein the requestor is a component of the legacy network.

17. The software defined network according to claim 15, wherein the incoming packet is a domain name system (DNS) request.

18. The software defined network according to claim 15, wherein the packet template is a template for a response to a DNS request.

* * * * *